United States Patent
Krieger, Sr.

[15] 3,688,008
[45] Aug. 29, 1972

[54] VISUAL DISPLAY UNIT
[72] Inventor: Robert G. Krieger, Sr., Burlington, N.C.
[73] Assignee: Bobbitt Laboratories, Burlington, N.C.
[22] Filed: May 25, 1970
[21] Appl. No.: 40,041

[52] U.S. Cl. .................................. 35/17, 40/106.52
[51] Int. Cl. ........................................... G09b 23/32
[58] Field of Search ............ 35/13, 17, 54; 40/106.52

[56] References Cited

UNITED STATES PATENTS

| | | | |
|---|---|---|---|
| 1,699,030 | 1/1929 | Seelen | 40/106.52 |
| 2,196,298 | 4/1940 | Garrison et al. | 35/17 |
| 2,499,646 | 3/1950 | Horn et al. | 35/54 |
| 3,178,833 | 4/1965 | Gulbransen, Jr. et al. | 35/17 |
| 3,421,232 | 1/1969 | Sherman et al. | 35/13 |
| 3,529,821 | 9/1970 | Piazza | 40/106.52 X |

FOREIGN PATENTS OR APPLICATIONS 214,025   4/1924   Great Britain ................. 35/13

*Primary Examiner*—Harland S. Skogquist
*Attorney*—Parrott, Bell, Seltzer, Park & Gibson

[57] ABSTRACT

A visual display unit adapted to graphically create the illusion of flow through a biological image such as the heart or nervous system. The illusion of flow is created by means of one or more rows of lamps which are adapted to be lighted in sequence along the rows. The rows are mounted behind a translucent panel on which the image is carried, and are positioned in a predetermined relationship with respect to the image so as to accurately reflect the flow pattern through the image. Thus when the flashing lamps are viewed through the image, the flow pattern will be apparent to the observer. Where more than one row of lamps is employed, means may be provided for independently actuating each row whereby different flow patterns may be illustrated.

2 Claims, 9 Drawing Figures

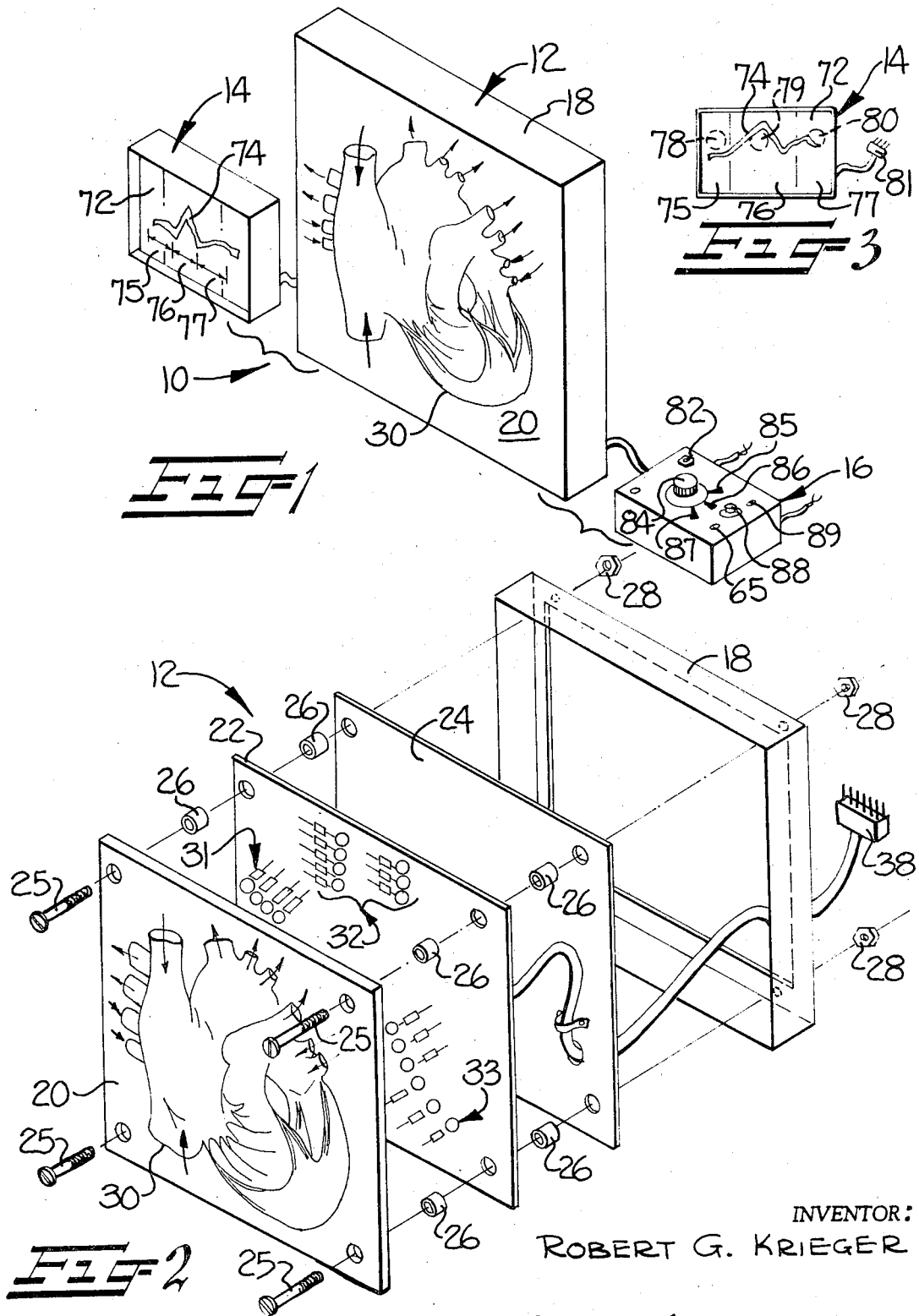

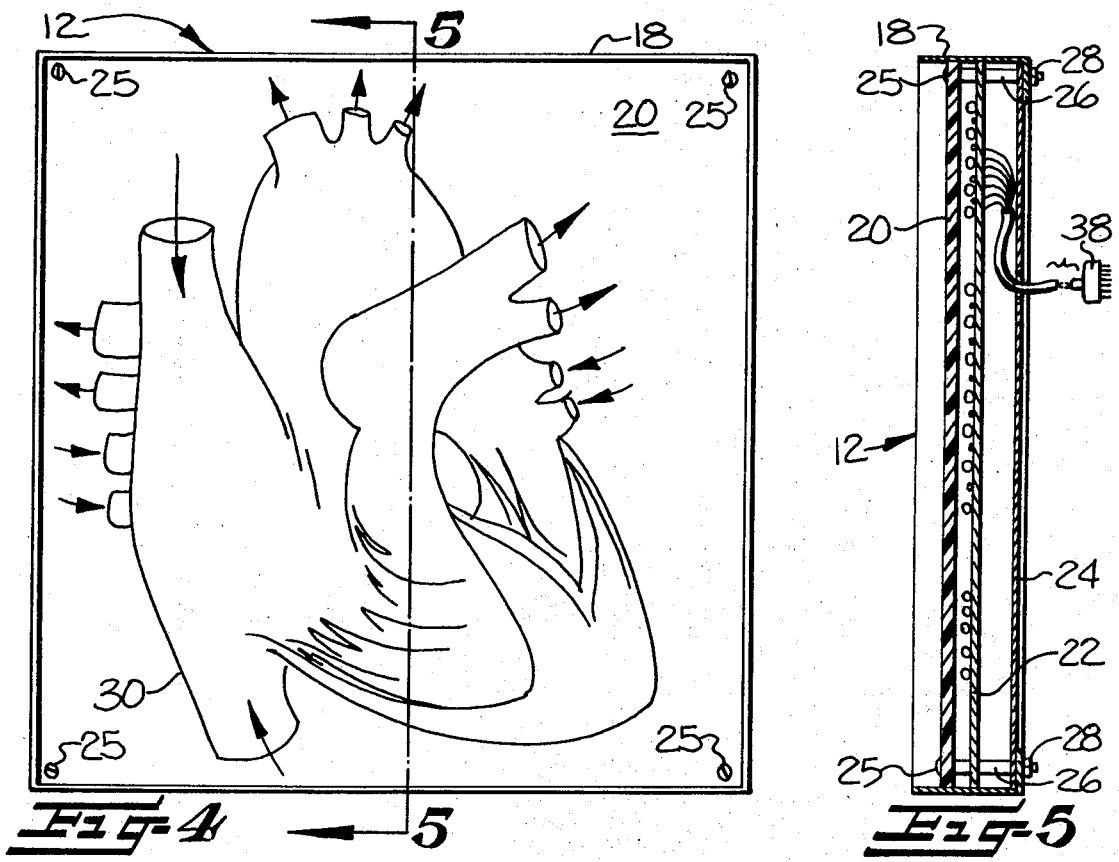
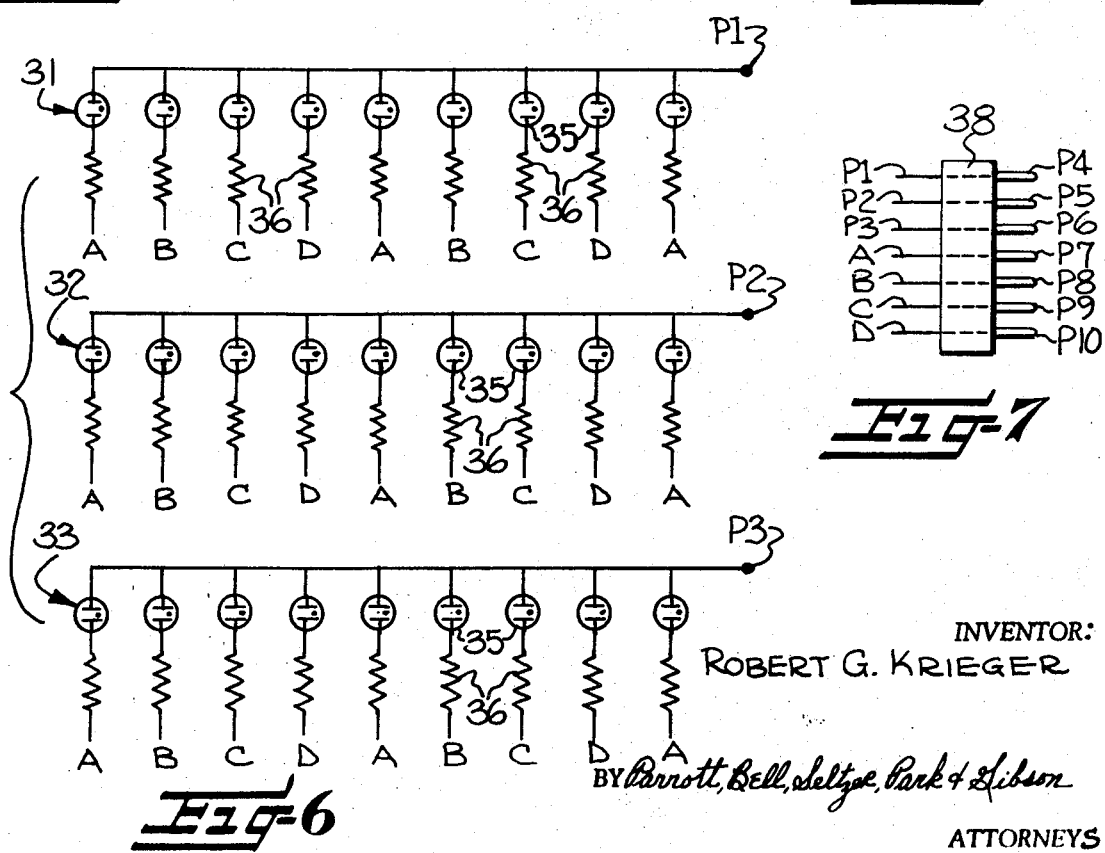

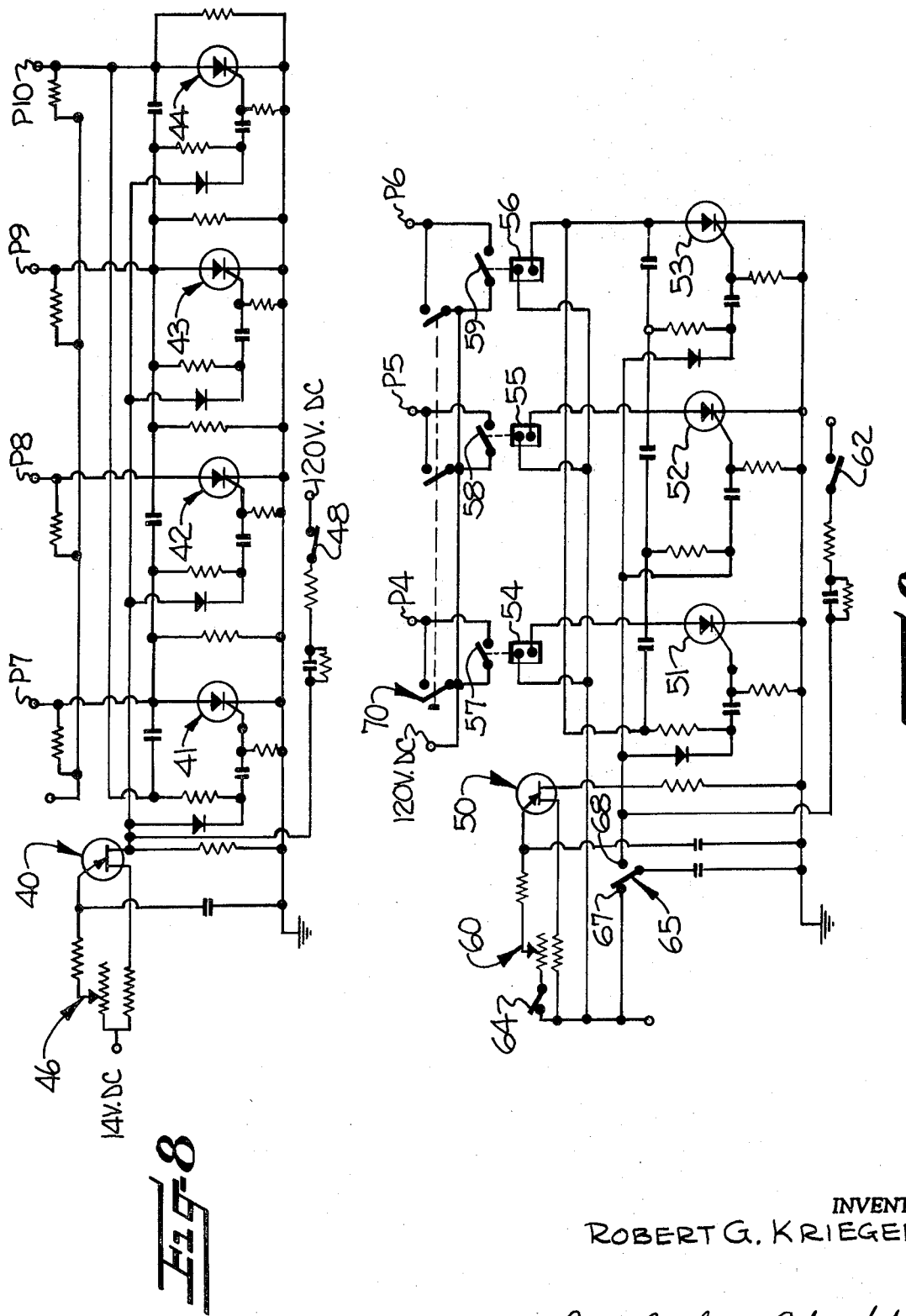

VISUAL DISPLAY UNIT

The present invention relates to a display device for graphically presenting information to an observer. More particularly, this invention relates to a visual educational display apparatus for illustrating flow through a biological system, such as the flow of blood through the heart, or the flow of a nerve impulse through the nervous system.

In the teaching of complex biological processes, it is common to employ mechanically adjustable simulators to graphically illustrate the process in question. Typically, such simulators comprise a number of overlapping image bearing transparent sheets which are adapted to be sequentially placed over an underlying image to indicate the various changes which take place during the process. While such simulators are generally satisfactory when used on an individual student basis, they are difficult to employ on a classroom basis since the size of the device becomes cumbersome and the details of the process are not readily observable at a distance. Also, the transparent sheets are somewhat fragile and easily torn, especially when the device is used by younger students.

It is accordingly an object of the present invention to provide a visual educational display apparatus which is suitable for use on an individual student basis, or on a classroom basis. In this regard, the present invention employs progressively flashing lamps behind an image bearing translucent panel to create the illusion of flow or movement in the image.

It is a further object of the present invention to provide a visual display apparatus wherein different flow patterns occurring during a biological process may be selectively illustrated. It is also an object of this invention to provide a display device wherein the different flow patterns which occur during certain biological processes may be independently illustrated in proper sequence.

It is a particular object of this invention to provide a display apparatus for graphically illustrating the flow of blood through the heart during a complete cycle of operation.

These and other objects and advantages of the present invention are achieved in the embodiment illustrated herein by the provision of a translucent panel having an image of the biological system in question carried on one surface thereof. At least one row of lamps is mounted adjacent the panel and disposed in a predetermined relationship with respect to the biological image, and means are provided for sequentially illuminating the lamps along the row to thereby create the illusion of flow through the biological image when the lamps are viewed through the translucent panel.

Some of the objects and advantages of the invention having been stated, others will appear as the description proceeds, when taken in connection with the accompanying drawings, in which FIG. 1 is an isometric view of the display apparatus of the present invention;

FIG. 2 is an exploded isometric view of the display unit of the apparatus;

FIG. 3 is a reduced front elevational view of the EKG unit;

FIG. 4 is an enlarged front elevational view of the display unit;

FIG. 5 is a sectional view of the display unit taken substantially along the line 5—5 of FIG. 4;

FIG. 6 is a schematic representation of a circuit for the rows of lamps utilized in the display unit of the present invention;

FIG. 7 is a schematic representation of the terminal connections across the plug of the display unit;

FIG. 8 is a schematic representation of a unijunction oscillator and four stage ring counter circuit utilized in the present invention; and FIG. 9 is a schematic representation of a unijunction oscillator and three stage ring counter circuit utilized in the present invention.

Referring to the drawings, a display apparatus embodying the teachings of the present invention is illustrated generally at 10 and comprises a display unit 12, an EKG (electrocardiogram) unit 14, and a control unit 16. While the illustrated apparatus relates to the function of the human heart, it will be appreciated that the invention could be utilized with a variety of other biological processes.

The display unit 12 includes a generally square, peripheral frame 18, an outer or front panel 20, a center panel 22, and a back panel 24. These three panels are secured together by bolts 25 which are adapted to pass through suitable apertures (not numbered) in each panel as well as the frame 18. Spacers 26 are positioned between each of the panels to maintain a closely spaced and parallel relationship between the three panels, and nuts 28 are provided for engaging the bolts 25 to maintain assembly of the unit.

The front panel 20 comprises a sheet of relatively thick (e.g. ¼ inch) normally transparent plastic or glass material, such as Plexiglas. The panel may be frosted by the application of a suitable dulling spray on the inner surface to render the panel translucent and produce a diffusion of the light passing therethrough. In the illustrated embodiment, the outer surface carries an image 30 of a human heart which may be applied to the panel by the conventional silk screen process. If desired, the image 30 may be highlighted by coloring the panel one color (e.g. red), and coloring the image 30 a different color (e.g. white).

Means are provided for mounting three individual rows of lamps 31, 32 and 33 on the center panel 22. As will become apparent, the use of three rows is preferable in the case of a heart simulation, but it should be understood that in other biological systems, a greater or lesser number of rows may be employed. Each row is disposed on the panel 22 in a predetermined relationship with respect to the image 30, and the lamps along each row are adapted to be sequentially lighted to create the illusion of flow or movement through the image when the lamps are viewed through the translucent panel 20. In the present embodiment, the first row 31 is disposed with respect to the blood flow into and out of the heart during the resting interval of the heart cycle, the second row 32 is disposed in relation to the blood flow during ventricular contraction, and the third row 33 is disposed in relation to the blood flow during ventricular recovery. Since the flow of blood into and out of the heart is in many directions during each of the above intervals, it will be appreciated that the three rows as defined above may comprise several spaced and independently flashing segments. Also, it should be recognized that the particular placement of the rows on the panel 22 as illustrated in FIG. 2 is intended to be schematic only.

As seen in FIG. 6, the lamps 35 along each of the three rows are connected in parallel to an input terminal (P1, P2, P3 respectively) and the output of each lamp leads across a series resistor 36 to one of four output terminals (A, B, C, and D). The lamps 35 themselves may be NE2H high intensity neon lamps, and the resistors 36 may be 33,000 ohm, ½ watt.

The terminals P1, P2, and P3 from the lamps 35 lead through a seven plug connector 38 to the driving circuits illustrated in FIGS. 8 and 9 and which are located in the control unit 16. The sequential flashing or illumination of the lamps along each row is controlled by a four stage ring counter circuit illustrated in FIG. 8. The details of a ring counter circuit are well known to those skilled in the art, and thus the circuit will be described here only in general terms. The circuit comprises a unijunction oscillator 40 which operates from a fourteen volt DC source, and which serves to sequentially fire the SCR rectifiers, 41, 42, 43, 44 and thereby sequentially close the leads from the terminals P7, P8, P9, and P10 (which are respectively connected via plug 38 to terminals A, B, C, and D). A flash frequency adjustment 46 is provided to control the speed of the flashing sequence and thus the speed of the apparent movement along the rows. Also, a start button 48 leading from a 120 volt DC source is provided to initiate operation of the flashing sequence.

The circuit for sequentially actuating each row of lights is illustrated in FIG. 9. This circuit is generally similar to that described above and includes a unijunction oscillator 50 and a three stage ring counter which includes the SCR rectifiers 51, 52, and 53. In this case however, the firing of the rectifiers closes the associated relays 54, 55, and 56. These relays in turn close the switches 57, 58 and 59 and thereby connect the terminals P4, P5 and P6 to a 120 volt DC source. Thus in operation, the sequential firing of the rectifiers 51, 52, and 53 operates to connect the terminals P4, P5, and P6 (and thus P1, P2, and P3) to the 120 volt DC source. As in the above four stage circuit, a sequential frequency adjustment 60 is provided to control the speed of the sequence, and a start button 62 is provided to initiate operation of the circuit. In addition, a manual control is provided for bypassing the oscillator 50 and comprises a manual/automatic selection switch 64 and a manual advance button 65. Thus, when the selection switch 64 is opened, advance is controlled by manual transfer of the switch 65 from terminal 67 to terminal 68. A three pole switch 70 may also be provided which is adapted to override the counter circuit and connect all three terminals P4, P5 and P6 concurrently to the 120 volt DC source. Thus when the switch 70 is closed, all three rows of lamps will be operating concurrently.

In the illustrated embodiment of the present invention, the EKG (electrocardiogram) unit 14 is adapted to graphically display the particular portion of the heart cycle which is under observation. The EKG unit 14 comprises a transparent front panel 72 which has an image 74 of a typical EKG trace printed thereon. The trace is divided into three regions, namely a first segment 75 indicating the resting interval of the heart, a second segment 76 indicating the ventricular excitation portion of the cycle, and a third segment 77 indicating the ventricular recovery portion. Three lamps 78, 79, and 80 (FIG. 3) are mounted behind the panel 72 with one lamp being disposed immediately behind each of the segments. These lamps are connected via the plug 81 to the terminals P4, P5, and P6, respectively, in the control unit 16, and thus the lamp 78 is lighted with row 31, lamp 79 is lighted with row 32, and lamp 80 is lighted with row 33. By this arrangement, the lamps 78, 79, and 80 indicate on the EKG trace the particular portion of the heart cycle under observation.

A suitable design for the placement of the controls on the control unit 16 is illustrated in FIG. 1. The control unit 16 includes a master on-off switch 82 and a center knob 84 which is rotatable between "Manual" terminal 85 and "Automatic" terminal 86 of the manual/automatic selection switch 64, and a "Total" terminal 87 wherein the three pole switch 70 is closed to light all three rows of lamps. A second knob 88 is provided which is interconnected to the flash frequency adjustment 46 and the sequence frequency adjustment 60 and thus is designed to operate these two adjustments in unison. The unit 16 also mounts a start button 89 which is interconnected with the buttons 48 and 62, and the manual advance button 65.

In operation, the master switch 82 is closed and the start button 89 is depressed to actuate the ring counting circuits. With the knob 84 turned to the "Automatic" terminal 86, the switch 64 will be closed and the terminals P4, P5, P6 will become sequentially conductive. When the terminal P4 is conductive, the row 31 will be operational, and the light 78 in the EKG unit, which is also connected to terminal P4, will be lighted. As indicated above, the row 31 is disposed on the panel 22 in a predetermined manner indicative of blood flow into the heart during the resting interval, and the fact that the light 78 in the EKG unit is lighted will visually inform the observer of this fact.

To create the illusion of movement along the row 31, it will be noted that the lamps in the row 31 are connected through the terminals A, B, C, and D to the terminals P7, P8, P9, and P10 of the four stage counter. Thus all the lamps connected to terminal A will be lighted during the conduction through terminal P7, all the lamps connected to terminal B will be lighted during conduction through P8, and so forth through terminals C and D and back to A.

When the three stage counter terminates conduction through terminal P4, and initiates conduction through P5, the row 32 of lamps connected to terminal P2 will become operational and the lamp 79 in the EKG unit will be lighted. This second row is disposed on the panel 22 in a predetermined manner indicative of blood flow through the heart during ventricular contraction and the individual lamps are lighted in the same manner described above. Similarly, the row 33 connected to terminal P3 will become operational and lamp 80 will be lighted when the terminal P6 of the three stage ring counter is conductive. This third row is disposed on the panel to indicate blood flow during ventricular recovery.

While in the above mode of operation, there will be an automatic advance from one row of lights to the next, and the portion of the heart cycle under observation in the display unit at a particular time will be indicated by the lighting of the appropriate lamp in the EKG unit. If the knob 84 is rotated to the "Manual"

terminal 85 to open switch 64, one of the terminals P4, P5, P6 and the corresponding lamp in the EKG unit will remain lighted until the unit is manually advanced by pressing the button 65. Rotating the knob 84 to the "Total" terminal 87 closes the switch 70 and permits concurrent operation of all three rows. Thus "Automatic" operation of the apparatus permits study of the sequential blood flow patterns during a heart cycle, while "manual" operation permits detailed study of the flow during a particular portion of the cycle. "Total" operation facilitates study of the total flow pattern through the heart. The "Rate" adjustment 88 permits simulated operation at different heart beat rates.

In the drawings and specification, there has been set forth a preferred embodiment of the invention, and although specific terms are employed, they are used in a generic and descriptive sense only and not for purposes of limitation.

I claim:

1. An educational display apparatus for graphically illustrating the flow of blood through the heart during a cycle of operation thereof and comprising, a translucent panel, means on said panel for defining a translucent image of the heart a plurality of lamps, a second panel disposed closely adjacent and parallel to said translucent panel, means mounting said lamps on said second panel in at least three rows with a first row disposed in predetermined fixed alignment behind said image defining means and in correlation with the pattern of blood flow during the resting interval of the heart cycle, a second row disposed in predetermined fixed alignment behind said image defining means and in correlation with the pattern of blood flow during ventricular contraction of the heart, and a third row disposed in predetermined fixed alignment behind said image defining means and in correlation with the pattern of blood flow during ventricular recovery of the heart, means for sequentially illuminating the lamps along each of said rows to create the illusion of movement along said rows and flow through the heart when the heart image on the translucent panel is viewed from the side opposite said second panel, means for independently actuating said illuminating means of said rows in an automatic sequence whereby the blood flow during the three portions of the heart cycle may be independently and sequentially illustrated, a second translucent panel, means on said second panel for defining a translucent image of an EKG trace, first lightening means operatively connected with said illuminating means for illuminating the resting segment of the EKG trace when said first row of lamps is lighted, second lighting means operatively connected with said illuminating means for illuminating the ventricular contraction segment of the EKG trace when said second row of lamps is lighted, and third lighting means operatively connected with said illuminating means for illuminating the ventricular recovery segment of the EKG trace when said third row of lamps is lighted.

2. The educational display apparatus as defined in claim 1, wherein the means for sequentially illuminating the lamps along each of said rows is adjustable to vary the rate of sequential illumination of the lamps such that the speed of the illusion of movement along the rows may be varied, and said means for independently actuating the illuminating means of said rows in an automatic sequence is adjustable such that the speed of the illustrated heart cycle may be varied.

* * * * *